Aug. 22, 1967 — R. F. PARKS — 3,336,959
METHOD OF IMPREGNATING WOODEN ARTICLES
Original Filed Jan. 24, 1964

INVENTOR.
ROBERT F. PARKS
BY
ATTORNEY

United States Patent Office 3,336,959
Patented Aug. 22, 1967

3,336,959
METHOD OF IMPREGNATING WOODEN ARTICLES
Robert F. Parks, 210 Shannon Drive, Greenville, S.C. 29607
Continuation of application Ser. No. 339,960, Jan. 24, 1964. This application May 10, 1966, Ser. No. 554,264
8 Claims. (Cl. 144—327)

ABSTRACT OF THE DISCLOSURE

Wood is heated to relieve internal stresses therein, shaped, and impregnated with a synthetic resin. The method includes drying wood to a moisture content of about 3–5% by weight, shaping the wood into an article, such as a bobbin, impregnating the wood with a vinyl monomer modified unsaturated polyester resin, coating the wood with a solution of a diallyl diester polymer dissolved in a diallyl diester monomer containing a polymerization catalyst, and heating to cross-link the polyester with the diallyl ester.

---

Figures 1, 2:
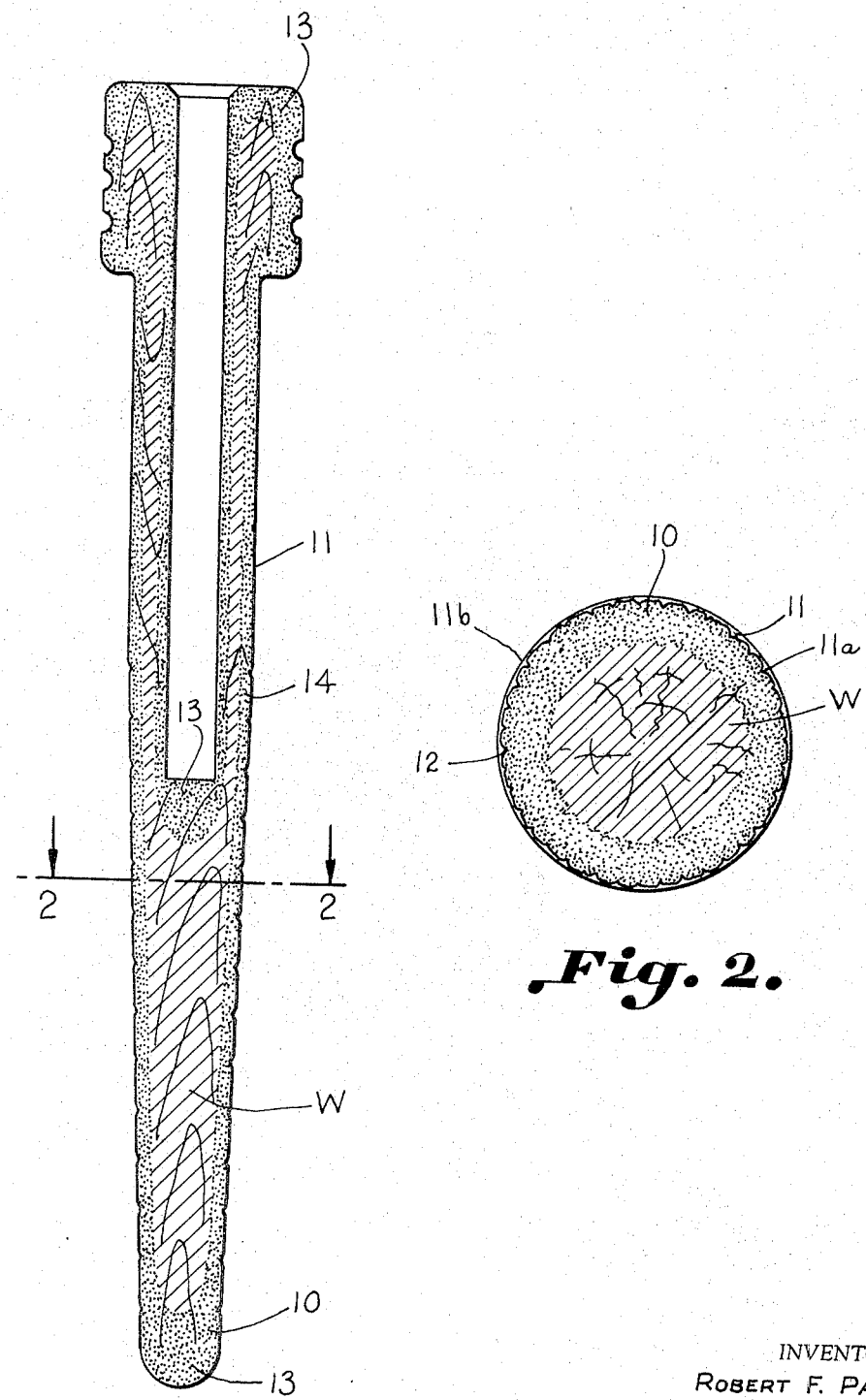

This application is a continuation of my application Ser. No. 339,960, filed Jan. 24, 1964, and now abandoned.

This invention relates to a method of treating wood and the articles produced therefrom. More specifically, it relates to wooden textile bobbins and shuttles, but it has more general application to wooden articles wherein dimensional stability, freedom from voids, and inert, tough, abrasion and impact resistant surfaces are desirable. The wooden article is first impregnated with a low-cost general purpose polyester resin and processed in such a way that remaining voids in the surface of the article are later filled with a chemical resistant modification of a polyester resin or other compatible resin system, such as diallylphthalate, sometimes referred to as DAP, to provide specific qualities to the resultant external finish of the article.

It is among the objects of this invention to improve the physical properties of wooden articles such as textile bobbins and shuttles, specifically their resistance to abrasion, and impact and to minimize swelling and shrinkage caused by varying degrees of humidity.

A further object is to provide wooden articles having a tough integral finish which is chemically inert, and substantially self-polishing.

Another important object of the invention is the provision of such important desirable characteristics through the use of an inexpensive resin which is easy to use within the article, than using the more expensive and hard to handle impregnant adjacent the surface where it is more easily handled.

A further object is to provide a method of impregnating wooden articles which is economical and which may be performed in a series of relatively simple, inexpensive steps.

Other objects and advantages will be apparent to those skilled in the art from the more detailed description which follows.

It has previously been proposed to impregnate wooden articles with synthetic resins, particularly thermosetting resins. Such methods proposed in United States Letters Patent Nos. 2,591,768, 2,867,543 and 3,029,159, for example, involve impregnation with vinyl-modified unsaturated polyesters. It has been found, however, that bobbins impregnated with these materials are not resistant to the lubricating and antistatic compounds commonly applied to textile strands, such as ROTASET yarns manufactured by E. I. du Pont De Nemours & Co. of Wilmington, Del. Prolonged use of such yarns tends to soften the usual polyester resins leeching them from the surface and causing gummy deposits which interfere with the proper use of the bobbin. A further disadvantage of such prior art impregnants is the fact that some of the ingredients thereof, such as styrene, are volatile at the curing temperatures necessary to effect curing of the resin, whereby pressure builds up in the wood during curing which forces the resin out of the pores of the wood. The resulting articles thus contain voids which detract from their abrasion, impact and moisture resistance.

In the practice of this invention the heating of the bobbins prior to their further manufacture after a normal kiln drying schedule is an important part of the process and has two effects on the ultimate quality of the article manufactured. Due to the heat involved in curing of the various resins in the various stages, it is desirable that the wood blank be subjected to temperatures as high as those used in subsequent curing stages prior to the actual machining of the wooden article. It has been found that when wood is heated to temperatures beyond about 160° F. some plasticization of the lignin in the wood takes place which allows residual stresses, which would cause warpage in a completely manufactured article, to relieve themselves. When this warpage or stress relief takes place in the rough blank a bobbin, for example, can be manufactured and processed at temperatures not exceeding the original stress relieving temperature without further warping resulting from stress relief. The practical limits of this temperature would be on the order of more than about 250° since very little or no stress relieving takes place at lower temperatures within reasonable time limits, about five hours. The stress relieving temperatures should be not greater than about 350° as temperatures above this point tend to degrade or lower the mechanical property values of the wood. A 300° temperature and prior kiln drying results in a reduction in the moisture content of the bobbin blank to nearly or practically 0, however, upon removal from the oven the bobbin blanks slowly absorb moisture from the atmosphere. It has been found that the wood splinters excessively during machining where the moisture content thereof is less than about 3% so that some moisture pick-up is highly desirable. This atmospheric moisture pick-up would normally continue, however, until the bobbin blanks reach their equilibrium moisture content of from about 7% to about 12%. This higher moisture content is undesirable since bobbins impregnated at this moisture content develop internal pressure from the water vapor trapped in the center of the bobbin and cause the impregnant to exude from the surface of the bobbin. Practical limits of moisture content prior to impregnation have been determined to be from approximately about 3% to about 5%. The lower limit is based on the machining quality of the wood and the upper limit is based on the point at which excessive exudation occurs during the curing of the impregnant. Thus, the moisture content upon machining should not be less than about 3% and should not exceed 5% prior to the actual impregnation of the bobbins.

The initial impregnation can be accomplished with varied conditions of vacuum and pressure. The impregnation can be accomplished by using vacuum and atmospheric pressure, vacuum and super atmospheric pressure and super atmospheric pressure without vacuum. The practical limits for the vacuum and pressure cycles using the material described herein are set forth below.

The vacuum cycle should be not less than about 20″ Hg nor more than about 27″ Hg. The lower vacuum limit is determined by the ability to cause infusion of the impregnating syrup into the wood pores at normal viscosities found under ambient temperatures of the impregnating fluid. The higher vacuum limit is determined so that excess volatilization or boiling of the impregnating solution is avoided. Atmospheric pressure cycles or super atmospheric pressure cycles are determined by the viscosity of the resins used in the impregnating syrup and by the depth of penetration actually desirable in the wooden article. The practical limitations on super atmospheric pressure are governed by the equipment and safety precautions and have been determined to be from about 0 super atmospheric pressure to about 50 pounds super atmospheric pressure.

The shaped articles, having a moisture content of about 3% to about 5% by weight, are first impregnated with a vinyl-modified unsaturated polyester resin. The thus impregnated article is then subjected to a second impregnation step with a solution containing a cross-linking thermosetting resin, preferably a diallyl phthalate polymer dissolved in diallyl phthalate monomer and preferably containing substantially no volatile ingredients. The second impregnating step may be accomplished such as by spraying, dipping or roller coating. The article is then subjected to curing conditions which cross-links the diallyl phthalate monomer and polymer with the vinyl modified polyester, resulting in an article free of voids, dimensionally stable and having an inert, tough, abrasion and impact resistant surface.

As pointed out above, it is desirable for the first impregnation that the wooden article have a sufficiently low moisture content to prevent vapor buildup in subsequent impregnation steps which would cause exudation of the impregnating material from the surface of the wood. The vinyl-modified unsaturated polyester resin employed in the first impregnation step is normally air inhibited. When using such an air inhibited resin it is desirable to cure the thus impregnated article prior to coating with the cross-linking thermosetting resin. Such curing drives off volatiles of the first impregnant leaving voids at the surface of the wood and exposed uncured resin having its links open for cross-linking with the second impregnant. The coating or second impregnant fills these voids at the surface and cross-links with the first impregnant thus accomplishing a mechanical and chemical bond. The resulting surface is smooth and highly chemical and heat resistant. If a surfacing agent, such as a small quantity of paraffin is used, the first impregnant is simply left uncured so that its links are available for cross-linking with the second impregnant.

Examples of the first impregnant include vinyl modified polyesters based on unsaturated dicarboxylic acids and glycols. Suitable acids include maleic acid, fumaric acid, and the like. Suitable glycols include ethylene glycol, propylene glycol, butylene glycol and the like. The polyester preferably contains esters of dicarboxylic acids containing no ethylenic unsaturation such as phthalic acid, succinic acid, adipic acid and the like. A preferred polyester is propylene glycol maleate-phthalate containing substantially equimolar quantities of maleic and phthalic acids.

The vinyl modifier may be styrene, alpha methyl styrene, vinyl toluene, divinyl benzene or the like. The vinyl monomer is usually present in amounts of from about 15 to 60% by weight of the mixture. The mixture also contains about 0.2 to 2% by weight of a polymerization catalyst such as benzoyl peroxide, cumene hydroperoxide, cyclohexanone peroxide, lauroyl peroxide or other well known polymerization catalysts.

The cross-linking polymer of the second impregnation is preferably a mixture of polymeric and monomeric diallyl phthalate or diallyl isophthalate. The mixture contains from about 10 to 40% by weight of polymer and the remainder monomer plus about 0.2 to 2% by weight of a peroxide curing catalyst, suitably benzoyl peroxide, tertiary-butal perbenzoate, and the like.

Example I

Bobbin blanks of northern maple are kiln dried to a moisture content of from about 7% to about 12% by weight in a cross ventilation forced circulation dry kiln according to the methods and schedules described in U.S. Dept. of Agriculture, Dept. Bulletin #1136, entitled "Kiln Drying Handbook." The bobbin blanks are then removed and placed in a circulating air controlled temperature oven at a temperature of about 300° F. and maintained at this temperature for a period of about 5 hours. The bobbin blanks are then removed from the oven and allowed to cool to the ambient temperature and are stored under atmospheric conditions for a period of about 24 hours until they return to reach a moisture content of from about 3% to about 5%. This period of storage can be minimized by returning the bobbin blanks to a controlled humidity and temperature kiln and applying the proper control of temperature and humidity; as described in the kiln drying handbook, the blanks may be quickly brought to a moisture content of about 3%. The bobbin blanks are then sawed to the correct length, bored and turned to the proper size.

An autoclave member of suitable size is then charged with the following mixture:

| | Parts |
|---|---|
| Monomeric styrene | 37 |
| Benzoyl peroxide | 1 |
| Polyester resin | 62 |

The above polyester was prepared by refluxing the following, after which the xylene was removed by vacuum distillation:

| | Mols |
|---|---|
| Maleic anhydride | 1 |
| Phthalic anhydride | 1 |
| Propylene glycol | 2.2 |
| Xylene | 0.35 |

The turned wood bobbins are then placed in the autoclave and held beneath the surface of the impregnating solution by means of weighted perforated metal lids. The autoclave is then closed and a vacuum about 20″ Hg to about 27″ Hg is drawn on the container and maintained for about 20 minutes. The autoclave is then vented to the atmosphere and allowed to remain at atmospheric pressure for about 4 minutes. The bobbins are then removed from the autoclave and allowed to drain for approximately 5 minutes and then placed in open wire baskets for a period of about 12 hours. The bobbins are then placed in a tumbler and tumbled for 10 to 15 minutes to distribute any excess resins that may have agglomerated during the air drying period. The bobbins are then placed in circulating hot air ovens and heated to about 160° for about 3 hours and the temperature is then increased to about 180° F. for about 3 additional hours. The bobbins are removed from the oven and tumbled for approximately 10 to 15 minutes to smooth out any roughness or grain raising produced by the curing cycle.

The bobbins are then sprayed with the following mixture:

| | Parts |
|---|---|
| Diallyl phthalate monomer | 200 |
| Diallyl phthalate polymer | 50 |
| Benzoyl peroxide | 5 |

The bobbins are baked for about 1 hour at about 300° F. and placed on a spindle rotated at about 3400 r.p.m. and wire wooled to produce a uniform matte finish. The resulting bobbins exhibited excellent abrasion and impact resistance and showed no deleterious effects from antistatic agents or textile lubricants. In the above example, all parts and percentages are by weight.

*Example II*

If desired, after the blanks have been shaped as set forth in Example I the autoclave chamber may be charged with polyester resin prepared by refluxing the following, after which the xylene was removed by vacuum distillation:

|  | Mols |
|---|---|
| Maleic anhydride | 1 |
| Phthalic anhydride | 1 |
| Propylene glycol | 2.2 |
| Xylene | 0.35 |

The turned wood bobbins are then placed into the autoclave and held beneath the surface of the impregnating solution by means of weighted perforated metal lids. The autoclave is then closed and a vacuum of not less than 20″ Hg nor more than 27″ Hg is drawn on the container and maintained for about 20 minutes. The autoclave is then pressurized to 45 p.s.i. and the bobbins allowed to remain for about 20 minutes. The bobbins are then removed from the autoclave and allowed to drain for approximately 5 minutes. The bobbins are then placed in a tumbler and tumbled for 10 to 15 minutes to distribute any excess resins that may have agglomerated during the air drying period. The bobbins are then placed in circulating hot air ovens and heated to 160° for 3 hours and the temperature is then increased to 180° F. for 3 additional hours. The remainder of the process is carried on as set forth in Example I above.

For a better understanding of the invention, reference is had to the accompanying drawing in which:

FIGURE 1 is a transverse sectional elevation illustrating the wood of a bobbin treated in accordance with the present invention, and FIGURE 2 is an enlarged sectional plan view taken on the line 2—2 in FIGURE 1 with the surface portion exaggerated for clarity of illustration.

Referring more particularly to the drawing, the letter W designates the wood of a bobbin or quill. That portion of the bobbin adjacent its surface which is impregnated in the first impregnation step is designated at 10. The impregnant deposited in the second impregnation step is designated at 11. It will be noted that the pores 12 of the wood are left at least partially unfilled by the first impregnant. Such openings are filled as at 11a by the second impregnant to provide a mechanical bond. A thin film 11b of second impregnant covers the bobbin. It will be noted by reference to FIGURE 1 that the penetration of the first impregnant is greatest in the areas adjacent the head of the grain of the wood as indicated at 13 and is least in the areas adjacent the cross grain portion as indicated at 14. Such penetration resulting in bobbins constructed in accordance with the examples given herein varies from about .250 inch in the areas of greatest penetration to about .06 inch in the areas of least penetration. Thus, the impregnant need not penetrate completely through the article although, such may be accomplished if desired.

The impregnation process described increases the Barcol hardness of the wood from a 35 to 50 value of raw maple to from 75 to 90 in the finished impregnated bobbin. A similar increase in hardness is found to occur in dogwood used in the manufacture of impregnated shuttles.

To indicate the relative chemical resistance of the cured DAP resin, the following is a percentage weight change on one month exposure to the following compounds:

| Compound | Styrene polyester, percent | DAP resin, percent |
|---|---|---|
| Acetone at 25° C | Dissolve | −.03 |
| 95% Ethanol at 25° C | +2.68 | +.20 |
| 20% Sodium Hydroxide at 70° C | +11.75 | −.26 |
| 30% Sulfuric Acid at 70° C | −1.58 | −.48 |

While the invention has been described in terms of certain examples, such examples are to be construed as illustrative rather than limiting, and it is intended to cover all modifications, embodiments and equivalents which fall within the spirit and scope of the appended claims.

What is claimed is:

1. The method of treating wood comprising the steps of drying the wood to a moisture content which is sufficiently low to prevent vapor build up in subsequent impregnation steps wherein exudation of the impregnating material from the surface of the wood would occur, forcing a vinyl monomer modified unsaturated polyester resin into the pores of the wood, coating the wood with a solution of about 10–40% by weight of a diallyl diester polymer dissolved in a diallyl diester monomer and containing a polymerization catalyst, and subsequently subjecting the coated wood to curing conditions to cross-link the polyester with the diallyl ester.

2. The method of claim 1 wherein said diallyl diester polymer is polymeric diallyl phthalate and said diallyl diester monomer is monomeric diallyl phthalate.

3. The method of claim 1 wherein said vinyl modified polyester is a mixture of monomeric styrene and a propylene glycol maleate-phthalate resin.

4. The method set forth in claim 1 wherein the wood is heated to from about 250° F. to about 350° F. to relieve internal stresses therein, the moisture content is restored to about 3–5% by weight and the wood is shaped into the desired article prior to impregnation with the vinyl monomer modified unsaturated polyester resin.

5. The method set forth in claim 4 wherein the vinyl monomer modified unsaturated polyester resin is cured before coating with the diallyl diester polymer solution.

6. The wood article produced by the process of claim 1.

7. The method set forth in claim 1 wherein the impregnated and coated wood is subjected to an elevated temperature to cross-link the polyester with the diallyl ester.

8. In a process for manufacturing bobbins and the like from a wood blank, the improvement comprising heating said wood blank to a temperature in the range of 250° F. to about 350° F. to relieve internal stresses therein while reducing the moisture content thereof to about 0, returning the moisture content of the wood to about 3–5% by weight, shaping the wood blank into the desired article, impregnating the desired article with said curable resin while the moisture content thereof is still about 3–5% by weight, and subjecting the impregnated article to a curing temperature not substantially exceeding the first mentioned heating temperature.

References Cited

UNITED STATES PATENTS

| | | | |
|---|---|---|---|
| 2,352,740 | 7/1944 | Shannon | 117—59 |
| 2,591,768 | 4/1952 | Austin | 117—59 X |
| 2,860,070 | 11/1958 | McDonald | 117—59 |
| 2,867,543 | 1/1959 | Braun | 117—59 X |
| 2,947,596 | 8/1960 | Barsy | 117—57 X |
| 3,029,159 | 4/1962 | Bliven et al. | 117—59 |
| 3,131,088 | 4/1964 | Festag | 117—161 |
| 3,197,331 | 7/1965 | Rohn | 117—123 |

WILLIAM D. MARTIN, *Primary Examiner.*

M. R. LUSIGNAN, H. W. MYLIUS,
*Assistant Examiners.*